Figure 1:
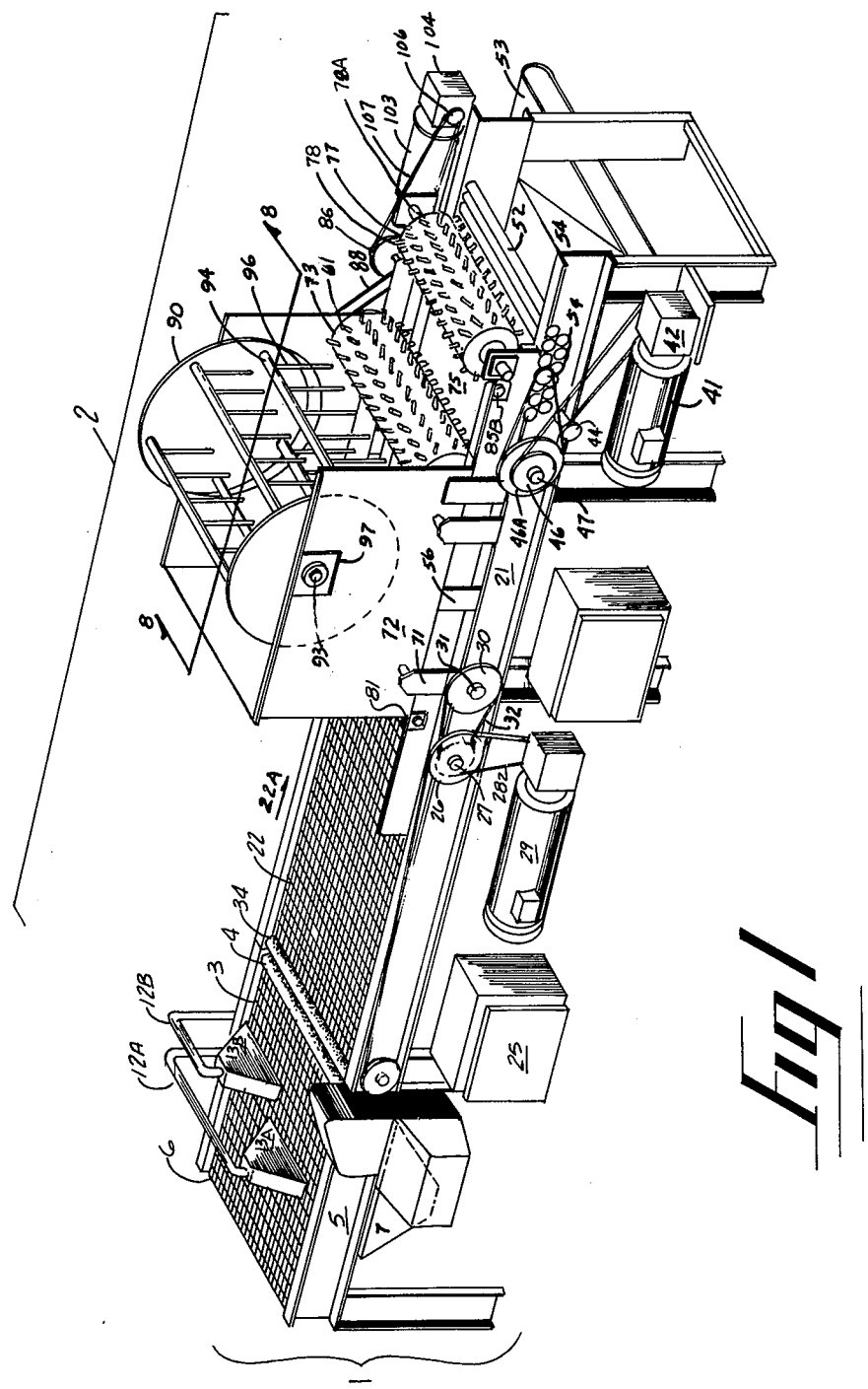

United States Patent [19]

Raque et al.

[11] 4,197,794
[45] Apr. 15, 1980

[54] PIZZA MACHINE

[76] Inventors: Glen F. Raque, 11107 Ainwick Ct., Louisville, Ky. 40243; Edward A. Robinson, 8914 Pine Lake Dr., Louisville, Ky. 40220

[21] Appl. No.: 955,107

[22] Filed: Oct. 26, 1978

Related U.S. Application Data

[63] Continuation-in-part of Ser. No. 944,576, Sep. 21, 1978, abandoned.

[51] Int. Cl.² ........................... A21C 9/04; B05C 5/00
[52] U.S. Cl. ...................................... 99/450.1; 99/494; 118/16; 118/24; 222/55
[58] Field of Search ................. 99/450.1, 450.6, 450.7, 99/494, 516; 118/16, 24, 25, 30; 222/55; 198/454, 455, 534

[56] References Cited

U.S. PATENT DOCUMENTS

| | | | |
|---|---|---|---|
| 2,920,355 | 1/1960 | Clark | 222/55 |
| 3,072,293 | 1/1963 | Greten | 222/55 |
| 3,779,205 | 12/1973 | Kuhlman | 118/24 |
| 3,908,584 | 9/1975 | Raque | 118/25 |
| 4,112,834 | 9/1978 | Thiry | 99/494 |

*Primary Examiner*—Harvey C. Hornsby
*Assistant Examiner*—Timothy F. Simone
*Attorney, Agent, or Firm*—Edward M. Steutermann

[57] ABSTRACT

A pizza topping device to apply ingredients to a pastry shell including first apertured conveyer means to receive a pre-formed pastry shell and convey the shell in a selected direction, applicator spray means including nozzle means disposed at a selected location above the first conveyer means to spray a selected, fluid, sauce-like material onto the pastry shells traveling on the first conveyer where the sauce-like material which oversprays the pastry shell flows through the apertures of the conveyer to sauce accumulator means, hopper means disposed above the first conveyer means to receive selected particulate topping substances to be applied to the sauce carried on the pastry shell where the hopper means includes a second conveyer means which is imperforate and is disposed in the bottom of the hopper where the topping material is carried on the second conveyer means in the same direction of travel as the direction of travel of the first conveyer, topping retention and mixing means disposed in the hopper to continually mix materials in the hopper and emit a selected depth of topping material on the second conveyer, delivery means to deliver topping emitted from the hopper on the second conveyer to the pastry shell traveling on the first conveyer where topping material carried to the first conveyer which is not received on a pastry shell falls through the first conveyer to accumulator mean.

5 Claims, 8 Drawing Figures

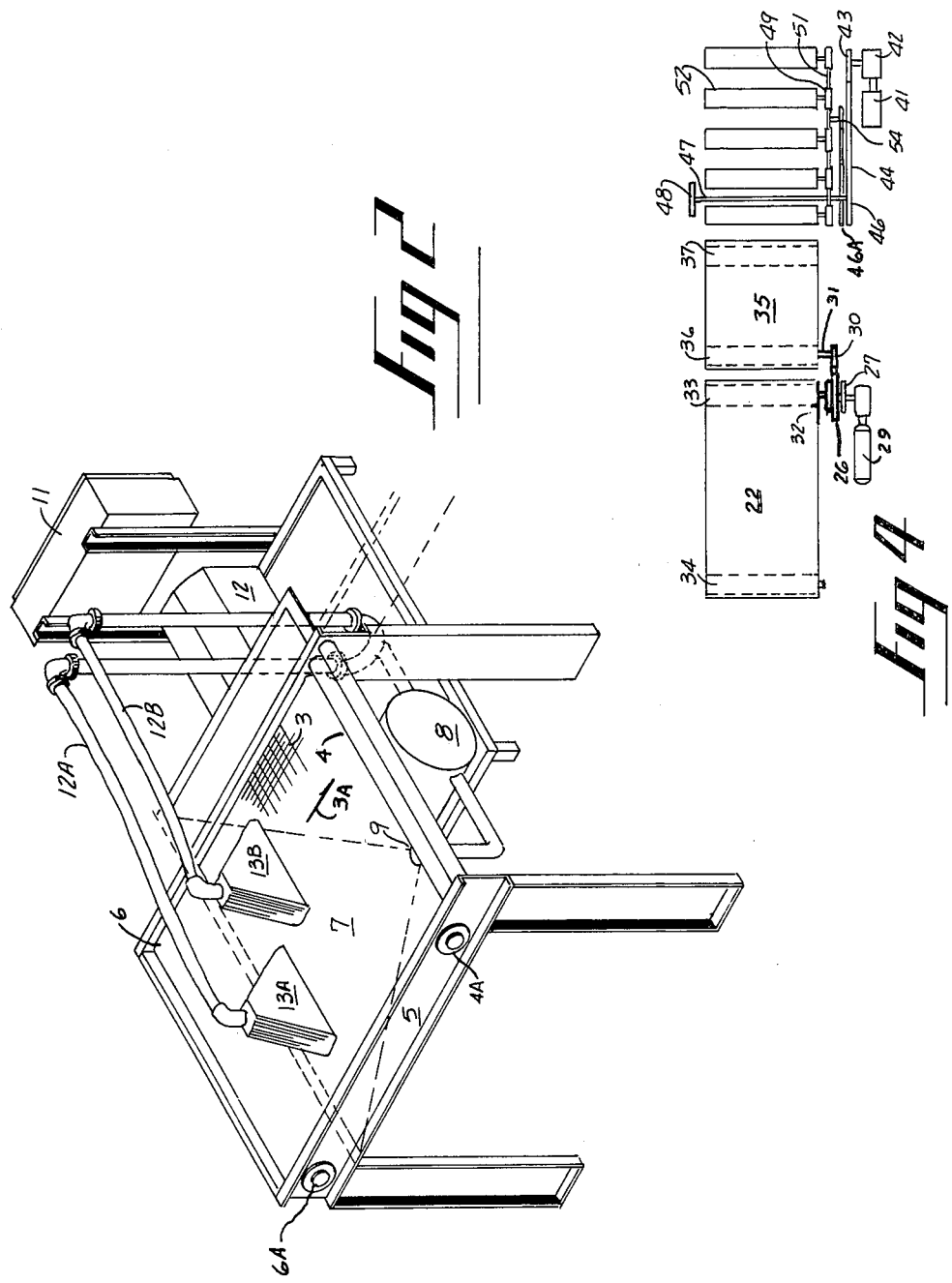

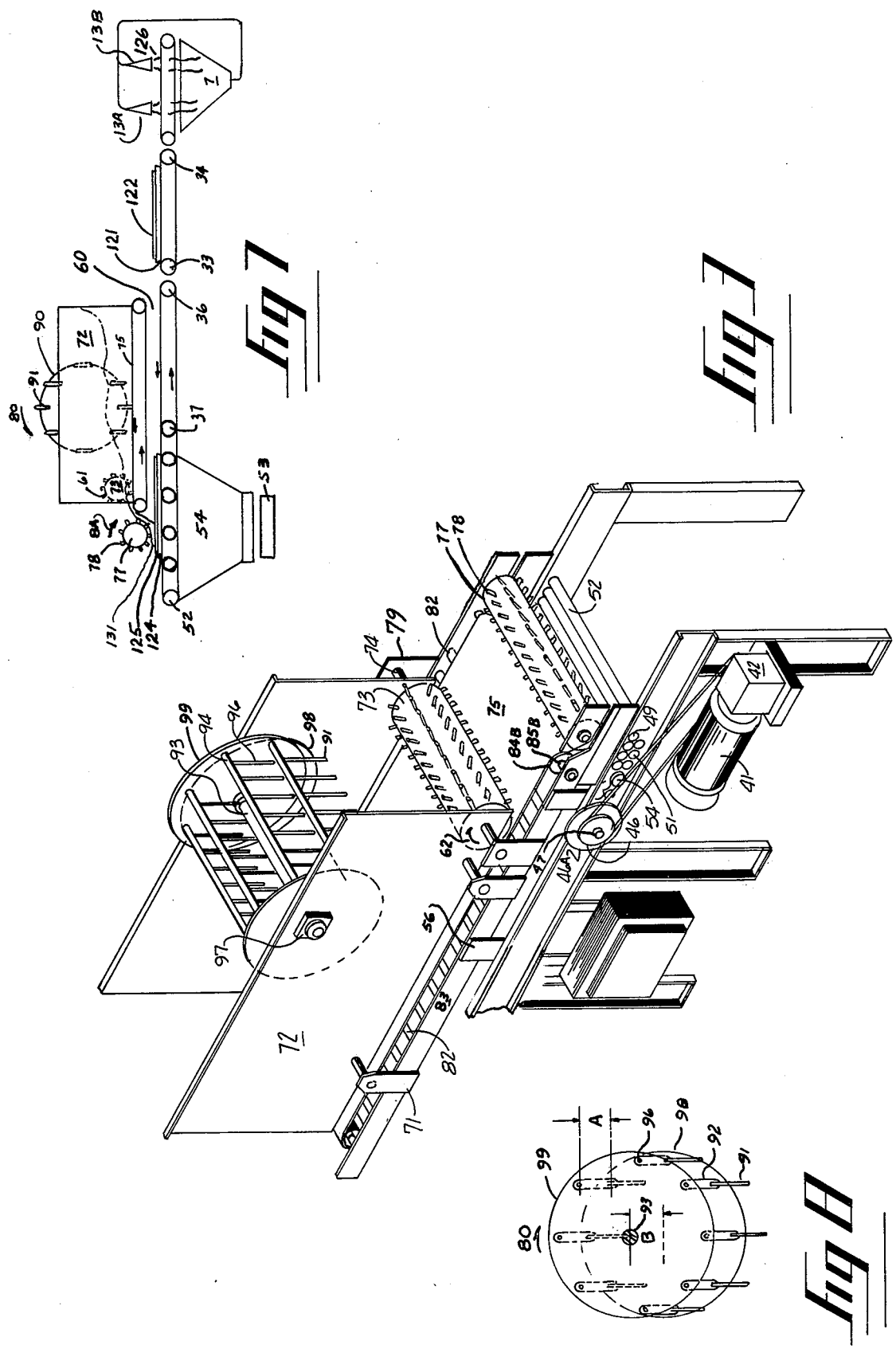

PIZZA MACHINE

BACKGROUND OF THE INVENTION

This application is a continuation in part of our pending application Ser. No. 944576 filed 9-21-78, now abandoned.

Various pastry-like foods, including pizza, are generally available where the product is produced as a pastry under shell with overlying layers of selected ingredients.

The food product commonly known as pizza includes a pastry shell covered with a layer of sauce, usually tomato based, with various selected topping ingredients such as cheese, olives, ground meat applied to the sauce covered shell prior to baking.

The popularity of such foods, and the volume of the market available for sale of such foods can in many instances justify automation of the procedures for the manufacture thereof.

Likewise, increasingly stringent health regulations, while in many instances permitting hand preparation of food products available for consumption in public restaurants, limit the degree of contact between the human hand and the food product in the case of products which are produced for resale in retail food outlets, or institutional service.

Heretofore, pizza type foods have been primarily assembled in their several separate stages, in separate operations and no devices are known in the art to exist where a pizza, or pizza type food, can be assembled in one completely integrated operation with minimal contact with the human body.

Moreover, such previous procedures have been labor intensive and therefore quite expensive and have required the pizza shell, or other pastry, to be handled numerous times during the preparation and prior to packaging.

SUMMARY OF THE INVENTION

The present invention provides a device wherein a food product based on an underlying pastry shell, for example a pizza type food, can be prepared from beginning to end with only minimal human contact particularly where it is not necessary to handle the pastry shell from the time the shell is placed on the device to the time the finished product is removed from the device ready for cooking or packaging.

Moreover, devices in accordance with the present invention are easily adapted to comply with even the most stringent health code because of the lack of human contact with the product and because the devices can be easily adapted for cleaning.

Likewise, devices in accordance with the present invention can be adapted to produce suitable pastry shell based food products in large quantities at high production rates so that the previously experienced labor factor in the preparation of such products is greatly reduced.

Briefly, the present invention provides a device to apply sauce to a pastry shell, recover the excess sauce which is not applied to the shell then apply selected particulate topping ingredients to the pastry shell then remove the excess ingredients while the pastry shell is in motion and where means are provided to recycle the unused portion of the ingredients not applied to the pizza shell and further where the particulate topping ingredients are supplied from a hopper where the contents of the hopper are thoroughly mixed until applied to the pizza shell.

More specifically, the present invention provides a topping device to apply ingredients to a pastry shell including first conveyor means to receive a pre-formed pastry shell and convey the shell in a selected direction thereon, sauce applicator spray means disposed at a selected location above the first conveyer means to spray a selected, fluid, sauce-like material onto the pastry shell traveling on the first conveyer where the sauce-like material which oversprays the pastry shell flows through the apertures of the conveyer to an accumulator means, hopper means disposed above the first conveyor means adapted to receive particulate topping materials to be applied to the pastry shell where the hopper means includes a second conveyer means which is imperforate, disposed in the bottom of the hopper so the topping material is carried on the second conveyer means in the same direction of travel as the direction of travel of the first conveyer, topping retention and mixing means disposed within the hopper to continually mix the topping materials in the hopper and emit a selected thickness of topping material on the second conveyer means, delivery means to deliver the topping carried on the second conveyer means to pastry shells carried on the first conveyer means.

While the device disclosed herein as an example of an arrangement within the scope of the present invention will be described in terms of preparation of a pizza type food, and will be recognized that devices within the scope of the present invention find applicability in preparation of other similar type foods.

Figure 5:
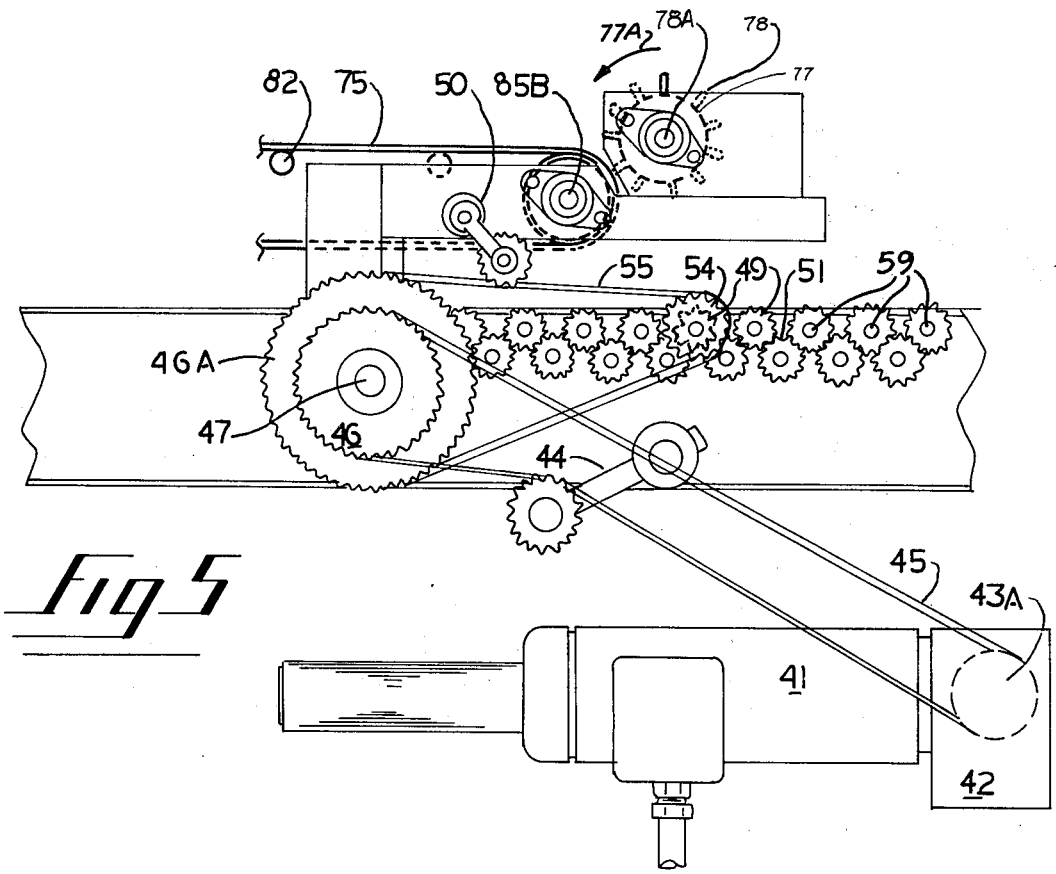
Figure 6:
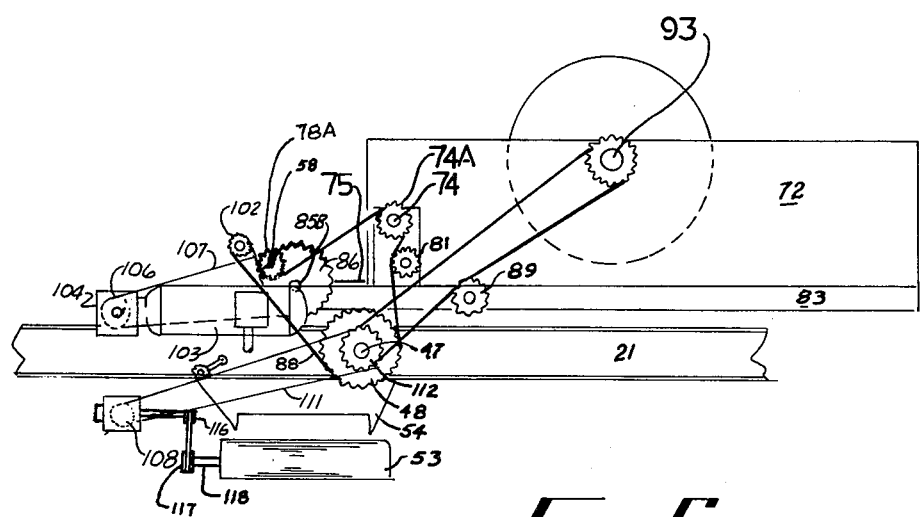

The following is a description of one example of an apparatus within the scope of the present invention is illustrated in terms of:

FIG. 1 is an overall perspective view of a complete apparatus in accordance with the present invention;

FIG. 2 which is a larger perspective view of one portion of the apparatus of FIG. 1;

FIG. 3 which is an enlarged view of a second portion of the apparatus shown in FIG. 1;

FIG. 4 which is a schematic illustration of a conveyor arrangement included in the apparatus shown in FIG. 1;

FIG. 5 which is a schematic illustration of the operation of a conveyor arrangement as shown in FIG. 1;

FIG. 6 which is a schematic illustration of another drive arrangement provided for a portion of the apparatus shown in FIG. 1;

FIG. 7 which is a schematic illustration of the operation of a device in accordance with the present invention;

FIG. 8 which is a view of an example of a mixing device taken along a plane passing through line 8-8 of FIG. 1.

Referring now to FIG. 1, the device illustrated includes two principal operations including the sauce applicator portion designated generally as 1 and the topping applicator section indicated generally as 2.

Referring to FIG. 2 which is a somewhat enlarged view of the sauce applicator section taken from a somewhat different angle, the sauce applicator apparatus is disposed on a framework 5 where a chain type or other aperatured type conveyor means 3 is provided to travel with the upper surface of the conveyer travels in the direction shown by arros 3A. The conveyer can be adapted to be driven by a motor (FIG. 2) adapted by means not shown, but including for example a sprocket and chain arrangement adapted to drive roller 6 to move chain 3 in the direction shown by 3A where cahin 3 travels around rollers 6 and 4 located at opposite ends of the framework 5 and adapted for rotation in journals 6A and 4A respectively.

A hopper 7 is disposed beneath conveyor 3 as shown, extends generally from side to side of frame 5 having an outlet 9 communicating with a pump 8, also driven by motor 12 (by means not shown) to recirculate material from hopper 7 to outlets 12A and 12B from pump 8 where nozzles 13A and 13B are disposed over the upper surface of conveyor 3 so that pizza sauce, or other suitable material, is emitted from nozzles 13A and 13B as a spray to be uniformly applied to pastry shells traveling on conveyor 3.

One purpose for the open work construction of conveyor 3 is to permit the overspray from nozzles 13A and 13B to pass through into hopper 7 for reuse.

Within the scope of the present invention, spikes (not shown) can be provided on the upper surface of conveyor 3 to extend upwardly therefrom so that the pastry shells rest on the tops of the spikes rather than on the surface of the conveyor to minimize contact between the bottom of the pizza shell and the conveyor surface to further minimize unwanted sauce pickup on the bottom of the pastry shell as it travels on conveyor 3.

The coated pizza shell is then passed from conveyor 3 to the topping applicator section, particularly to conveyor 22 of the topping applicator section 2 where conveyor 22, like conveyor 3 is of an open work construction. Conveyor 22 is adapted to travel around rollers 34 and 33, best illustrated in FIG. 4 where drive roller 33 is driven by a shaft 27 journaled in framework 21 provided to support the entire topping section.

As shown in FIGS. 1 and 4, a motor 29 is provided to drive conveyor 22 by means of a chain 28 traveling around a sprocket 26 carried by shaft 27 where a second sprocket 26A is provided to drive a chain 32 around a sprocket 30 which rotates a shaft 31 to drive a conveyor section 35 located beneath hopper 72 as described hereinafter.

A second conveyor 35, similar to the structure of conveyor 22, can be provided beneath hopper 72 to travel around rollers 36 and 37 where roller 36 is driven by sprocket 30 carried on shaft 31 which extends across the width of frame 21 as illustrated schematically in FIG. 4.

The pizza shells travel along conveyor 35 and beneath hopper 72 where the topping material is stored and blended as described hereinafter and upon emission from conveyor 35, the topping material is applied to the pizza as described hereinafter as the pizza shell is received on the conveyor composed of spaced rollers 52 as shown in FIG. 4. The drive arrangement for rollers 52 is shown in FIGS. 1, 3, and will be explained with respect to FIGS. 4 and 5.

With respect to FIG. 3, a motor 41 is provided to drive rollers 52, as shown in FIG. 4, where motor 41 is connected to a right angle speed reducer 42 to drive a sprocket 43 at a selected speed to drive a chain 45 around a sprocket 46 carried on frame 21 where a tension idler 44 is provided, as shown in FIG. 5 to continually adjust the tension in chain 45. Sprocket 46 rotates a shaft 47, which as shown in FIG. 4 extends across the width of frame 21 to a sprocket 48. A sprocket 46A is also carried by shaft 47 to drive a chain 55 around a sprocket 54 carried on a shaft 59 journaled at opposite ends of frame 21 where a multiplicity of shafts 59 are provided with each carrying a roller 52 for rotation by the shafts 59 and, as shown in FIG. 5 on the side of the frame 21 shown, each shaft 59 carries a gear 49, where one gear 49 is rotated by sprocket 54. An idler gear 51 is provided between each gear 49 to appropriately mesh with the gears 49 so that all gears 49 turn in the same direction and, consequently, rotate rollers 52 in the same direction to convey the pizza shell as previously described. Advantageously, a spacing 52A (FIG. 3) is provided between each of the rollers 52 to permit the topping material which does not fall onto the pizza shell to fall between the rollers 52 and onto a hopper 54 thence, located beneath conveyor rollers 52 and from hopper 52 to a conveyor 53 where the material is recovered for disposal or recycling to hopper 72 as described hereinafter.

With respect to the topping ingredients supply, referring to FIG. 3, a hopper 72 is provided to receive and store the topping ingredients. Hopper 72 is suspended above a conveyor base 83 by means of brackets 71 where the sides of hopper 72 extned downwardly to a point immediately adjacent to the upper surface of an imperforate conveyor belt 75. Advantageously, conveyor belt 75 is adapted for movement about rollers 84A and 84B both journaled in journals 85A and 85B as shown. Intermediate idler rollers 82 are provided to maintain the position of the upper flight of conveyor 75 in the proper position with respect to the bottom of hopper 72 to prevent escape of topping material from the sides of hopper 72.

Conveyor base 83 is fastened to frame 21 by means of brackets 56 as shown.

In accordance with one feature of the present invention a mixer device is provided in hopper 72 to maintain the integrity of the mixture of the materials in the device where it is understood that diverse materials may be added and it is necessary to maintain a proper mixture thereof.

In the example shown in FIG. 3 a carrousel mixer and flow regulator 90 is provided to rotate on a shaft 93 where, with respect to FIG. 8, two eccentric discs 98 and 99 are provided. Shaft 93 is centered in disc 99 but is off center with respect to disc 98 by dimension B (FIG. 8). As shown, shafts 94 are rotatably received in journals in discs 99 and the ends of the shafts 94 which extend through disc 99 are connected to linkages 92 which are connected to pivots 96 carried by discs 98 so that, as shown, the distance between shaft 93 of disc 99 and the centers of the pivots on links 92 (dimension A FIG. 8), is equal to dimension B so that fingers 91 carried by shafts 94 are always pointed downwardly when shaft 93 rotates disc 99. In order to accomplish the foregoing result, it will be recognized that disc 99 is fixed for rotation with shaft 93 while disc 98 is free to rotate independent of shaft 93.

In accordance with another feature of the present invention means are provided to retain topping material within hopper 72 and control the emission of the material from hopper 72.

It has been found that the carrousel mixer assembly 90 can provide both the flow control and mixing necessary for proper operation of the device. Specifically, carrousel 90 is rotated at a selected speed in a direction of rotation so that the bottom of the arc of rotation fingers 91 move in a direction opposite to the direction of travel of conveyor 75 so that fingers 91 comb through the topping mixture to separate the materials and move the materials backward with respect to the direction of travel of conveyor 75. Advantageously, the vertical position of carrousel 90 is adjusted so that the clearance between fingers 91 and conveyor 75 is approximately equal to the depth of topping desired so that fingers 91 simultaneously comb the topping and the speed of carrousel 90 is adjusted to retain the topping in hopper 72 except for that portion of topping which passes beneath fingers 91 so that carrousel 90 acts as a metering device.

In some applications a second device can be utilized to further meter the flow of topping and in the example shown, a drum 73, carried by a rotatable shaft 74 journaled in brackets 79 is provided where fingers 61 extend radially outwardly from drum 73 which is rotated in the direction shown by arrow 62 so that the roller also retains topping material in hopper 72. In such applications drum 73 is disposed a selected distance above the upper flight of conveyor 75 so that the top material emitted from hopper 72 on conveyor 75 passes beneath fingers 61 unless an excessive thickness of material is emitted from hopper 72.

The drive arrangement for drum 73 and, for drum 78 located downstream from conveyor 75 will be discussed simultaneously hereinafter.

However, when a carrousel mixer of the type shown in FIGS. 1 and 3 is provided and is rotated so that the orbital path of the downwardly extending fingers 91 of the carrousel causes the fingers to move in a direction opposite to the direction of travel of belt 75 so the fingers pass through the mass of topping retained in hopper 72 and moves the topping toward the rear of hopper 72 and the clearance between the bottom of the orbital path of fingers 91 and the surface of belt 75 so the carrousel primarily determines the thickness of topping emitted from hopper 72 to be applied to the shells.

With respect to drum 77, the drum 77 is carried by shaft 101 journaled in brackets 57 located at opposite sides of base 83. Drum 77 is located a selected distance from roller 84B around which conveyor 75 passes to provide an opening 60 (FIG. 7) for the topping material carried by conveyor 75 to drop onto the pizza shells passing under the space 60 as a waterfall. Drum 77, like drum 73, includes outwardly extending fingers 78 to control the rate of application of topping material to the pizza shell dependent on the separation between the end of conveyor 75 and the rate of rotation of drum 77 where the rate of rotation of drum 77 is selectively determined by the diameter of sprocket 58 (FIG. 1) and the speed of chain 88 which drives sprocket 58 as described herein. Accordingly, drum 77 turns in the direction indicated by arrow 77A where the surface of the drum and the surface of conveyor 75 move in the same direction in space 60.

The drive arrangement to drive shaft 93 of the carrousel mixer and shaft 74 rotating drum 73 in the direction shown by arrow 62 and sprocket 58 which drives shaft 7A of drum 77 is best described with reference to FIG. 6. In FIG. 6, it can be seen that shaft 47, as previously described, extends through, and is journaled in frame 21 and is driven by sprocket 46 on the opposite side of frame 21. Shaft 47 carries a sprocket 48 and a sprocket 112. Sprocket 48 is adapted to receive a drive chain 88 which travels under an adjustable chain tension device 81, as is known in the art, around a sprocket 74A to drive shaft 74 which drives drum 73 in a direction opposite to the direction of rotation of drum 77 and under sprocket 58 to drive shaft 78A and drum 77 in the direction shown by arrow 8A of FIG. 7.

A motor 103 is provided to drive a speed reducer 104 having an output sprocket 106 which drives a chain 107 received by a sprocket 86 to drive shaft 85B to rotate roller 84B to drive conveyor 75 in the general direction shown in FIG. 3.

A third sprocket (not shown) can be provided on shaft 47 to drive a sprocket 108 of a speed reducer 110 having an output sprocket 116 to drive a chain driving a sprocket 117 connected to a shaft 118 which powers conveyor 53 (see FIG. 1). A hopper 54 is provided beneath the separation between the end of belt 75 and the periphery of drum 77 so that topping material which is not received by a pizza shell falls through hopper 54 onto conveyor 53 for return to the process.

Referring now to FIG. 7 which illustrates one mode of operation of a device which within the scope of the present invention with respect to two pizza shells 121 and 124, both of which have a layer of sauce topping respectively 122 and 125. Pizza shell 121 is shown emerging from the pizza spray heads 13A, 13B where the sauce sprays 13A and 13B continue to emit a stream of sauce 126 into hopper 7 for return and recirculation. Pizza shell 121 is passed to the conveyor defined between end rollers 33 and 34 while pizza shell 124 is in position beneath space 60 between roller 77 and the end of conveyor 75 to receive the waterfall of topping material. As shown, the fingers 78 of drum 70 extend into the waterfall 123 of topping material which is being applied to pizza shell 124.

Additionally, where a device similar to drum 73 is provided, the drawing shows an excess accumulation of topping behind drum 73 so as it rotates the bottoms of fingers 61 adjacent to conveyor 75 regulate the quantity of topping material emitted from hopper 72. Within the scope of the present invention, it has been found that when a mixer carrousel 90 of the type shown is provided, drum 73 can be eliminated where fingers of carrousel 90, when in rotation, dip through the bed of topping and at the bottom of the orbit are spaced a selected distance above the surface of the upper flight of conveyor 75 to provide the proper depth of topping on conveyor 75.

Having described one arrangement in accordance with the present invention, it will be obvious that there are other arrangements within the scope of the present invention which will become obvious to those reading the disclosure set forth hereinbefore.

The invention claimed is:

1. A pizza topping device to apply selected ingredients to a pastry shell including:
   a. first aperatured conveyor means to receive a preformed pastry shell and convey said shell in a selected direction;
   b. applicator spray means disposed at a selected location above the said first conveyor means to spray a selected fluid, sauce-like material onto said pastry shell traveling on said first conveyor;
   c. hopper means disposed above said first conveyor means to receive selected particulate topping substances to be applied to said pastry shell traveling on said first conveyor where said hopper means includes inperforate second conveyor means disposed in the bottom of said hopper where said topping material is carried on said second conveyor means in the same direction of travel as the direction of travel as the direction of travel of said first conveyor; topping retention and mixing means disposed in said hopper to mix topping material in said hopper and meter emission of selected quantity of topping material from said conveyor wherein said topping retention and mixing includes a carrousel mixing device having spaced disc means journaled for rotation on opposite sides of said hopper means about an axis transverse to said first direction with at least two parallel arm means extending between said disc means a selected distance from the center of said disc means for rotation of said disc means where a finger means are provided and extend from said arm means where said disc means are adapted to orient said finger means in a downward direction during the rotation of said disc means and where the outer tips of said finger means are adapted to approach said second conveyor means at the lowest point of their arc of travel in spaced relation therefrom so said finger means comb through said topping and move a portion of said topping in a direction opposite the direction of travel of said conveyor where topping to be emitted is carried on said second conveyor means with drive means to rotate said disc means of said mixer means in a direction such that the direction of movement of said finger means at the bottom of the orbital travel thereof is opposite the direction of travel of said conveyor means to pass through and retain topping in said hopper and control rate of emission of topping from said hopper;

e. delivery means to deliver topping material emitted from said hopper on said second conveyor to said pastry shells traveling on said first conveyor.

2. The invention of claim 1 including sauce overspray recovery means to recover said selected fluid, sauce-like material sprayed towards said first conveyor which is not received on said pizza shells.

3. The invention of claim 1 including hopper means disposed beneath said delivery means to recover topping material delivered from said second conveyor which is not retained on pastry shells traveling on said first conveyor means.

4. The invention of claim 1 wherein said topping retention means includes drum means disposed at the outlet from hopper means and rotated in a direction such that the bottom edge of said drum means moves in a direction opposite to the direction of travel of said second conveyor means where finger means are provided to extend radially outwardly from said drum means where the tips of said finger means approach said second conveyor means at the lowest point of their arc of travel.

5. The invention of claim 1 wherein said delivery means includes delivery drum means disposed a selected distance from the end of said first conveyor means for rotation about an axis transverse to the direction of travel of said second conveyor means to define a flow space for emission of topping therebetween and where said drum means includes finger means extending radially outwardly therefrom where said drum means is rotated in a direction such that the tips of said finger means adjacent the ends of said conveyor means rotate in the same direction of travel as said conveyor means so that the topping ingredients carried by said second conveyor fall from said first conveyor, with the aid of said delivery drum means, as a waterfall onto the pastry shells traveling on said first conveyor means.

* * * * *